(12) United States Patent
Schuelke

(10) Patent No.: US 12,268,204 B2
(45) Date of Patent: Apr. 8, 2025

(54) LIVE RODENT TRAP WITH VACUUM FUNCTION

(71) Applicant: David Schuelke, Park City, UT (US)

(72) Inventor: David Schuelke, Park City, UT (US)

( * ) Notice: Subject to any disclaimer, the term of this patent is extended or adjusted under 35 U.S.C. 154(b) by 32 days.

(21) Appl. No.: 18/468,698

(22) Filed: Sep. 16, 2023

(65) Prior Publication Data

US 2024/0180143 A1    Jun. 6, 2024

Related U.S. Application Data

(60) Provisional application No. 63/429,953, filed on Dec. 2, 2022.

(51) Int. Cl.
*A01M 23/02*    (2006.01)
*A01M 23/38*    (2006.01)

(52) U.S. Cl.
CPC ............ *A01M 23/02* (2013.01); *A01M 23/38* (2013.01)

(58) Field of Classification Search
CPC .............................. A01M 23/02; A01M 23/38
See application file for complete search history.

(56) References Cited

U.S. PATENT DOCUMENTS

| | | | | |
|---|---|---|---|---|
| 4,566,218 A * | 1/1986 | Kurosawa | ............. | A01M 23/08 43/60 |
| 5,040,326 A * | 8/1991 | Van Dijnsen | ......... | A01M 23/12 43/65 |
| 6,865,843 B1 * | 3/2005 | Jordan, Sr. | ............ | A01M 23/12 43/60 |
| 8,701,338 B1 * | 4/2014 | Walsh, Jr. | ............. | A01M 23/12 43/139 |
| 8,701,339 B1 * | 4/2014 | Walsh | ................. | A01M 31/002 43/139 |
| 10,893,671 B1 * | 1/2021 | Nelson | ................... | A01M 23/02 |
| 2015/0020436 A1 * | 1/2015 | James | ................... | A01M 23/02 43/58 |

* cited by examiner

*Primary Examiner* — Richard G Davis
(74) *Attorney, Agent, or Firm* — Steven Rinehart

(57) ABSTRACT

A rodent trap adapted to insert through a wall surface, in some embodiments into an interior, inaccessible void, the rodent trap comprising an elongated tubular component having an open distal end and an open proximal end, the open proximal end connected to a vacuum and flexible arm, the rodent trap operable to suck a rodent entering the elongated tubular component into the vacuum.

7 Claims, 5 Drawing Sheets

LIVE RODENT TRAP WITH VACUUM FUNCTION

FIELD OF THE INVENTION

This invention relates to rodent traps and more particularly relates to rodent traps adapted primarily for catching rats and mice.

BACKGROUND

Description of the Related Art

Rodents, including mice and rats, can destroy articles of food, books, furnishing, and homes. These rodents carry disease and infestations which may result in closure of commercial businesses and sickening of residents in residential settings. Rodents' gnawing, urine and feces can poison humans or infect humans with any of a plurality of deadly viruses, including hantavirus.

Rodents typically invade through cracks, spaces and openings (such as vents, pipes and chimney access points) into a home. Traditional snap traps are often used by homeowners and pest control specialists to attempt to rid homes of rodent infestations, but these traps usually placed only where easily accessible by homeowners. Problematic in the art is that rodents typically occupy places in buildings which are not easily accessible by pest control specialists or homeowners, such as above ceilings or within walls.

Wooden snap traps are common, but expose the homeowner, for example, to the undesirable task of disposing of the dead mouse once trapped. In addition, once trapped, the exposed dead mouse can pose health problems or cause distress to, for example, children. Such traps are also pose a danger to pets who may inadvertently activate the trigger and injure themselves. Whilst mousetraps have been developed which do not kill the rodent, they also cannot be optimally placed.

Attempting to rid a building of rodents can be an expensive, labor intensive and time-consuming exercise and is not always possible. Other traditional methods of dealing with rodent invasions involves the use of poisoned baits (rodenticides) that contain anticoagulants, such as warfarin, pival and chlorophacinone. Such baits are nevertheless toxic and are therefore undesirable for use in the home, particularly those in which children and pets reside and which may be inadvertently exposed to these poisons. In addition, poisoned mice often die in inaccessible locations thereby resulting in an unpleasant odor upon death of the mouse.

Finally, many homeowners would rather employ traps which do not harm rodents than traps which do.

While recognizing the shortcomings of prior art mousetraps, the present inventors have sought to overcome these deficiencies with a mousetrap that substantially can be easily inserted into inaccessible areas and which does not kill the rodent.

Such traps are desirably simple and cost effective to manufacture and are also able to efficiently trap mice. Traditional trapping devices do not provide a means for performing these functions and device which is operable to do so is desirable.

SUMMARY

From the foregoing discussion, it should be apparent that a need exists for a live rodent trap with vacuum function. Accordingly, the present invention has been developed to provide a live rodent trap with vacuum function adapted to trap a live rodent, the rodent trap comprising: an elongated tubular component comprising a sidewall having an open proximal end and an open distal end, the tubular component defining a hollow interior recess of between 1-6 inches wide within the sidewall; a proximity sensor affixed to the tubular component between 1 and 24 inches from the open distal end, the proximity sensor penetrating a sidewall of the elongated tubular component; a switch operable to power on the vacuum in response to activation of the proximity sensor; a vacuum having a reservoir for storing debris sucked into the vacuum; and a flexible arm interconnecting the elongated tubular component and the vacuum.

The rodent trap may further comprise a mounting plate comprising a planar base plate defining a bore dimensioned in congruency with a dimension of an outer surface of the sidewall.

The mounting plate may further comprise an elongated protuberance jutting from a surface of the base plate. The rodent trap may further comprise a switch box and power cable affixed to the sidewall.

In various embodiments, the switch box further comprises one or more of a wireless transceiver, a camera, a microphone, and motion detector.

The rodent trap, in some embodiments, further comprises a perishable food mounted within the hollow interior recess adapted to serve as bait for a rodent.

A second live rodent trap with vacuum function adapted to trap a live rodent is provided, the rodent trap comprising: an elongated tubular component comprising a sidewall having an open proximal end and an open distal end, the tubular component defining a hollow interior recess of between 1-6 inches wide within the sidewall; a proximity sensor affixed to the tubular component between 1 and 24 inches from the open distal end, the proximity sensor penetrating a sidewall of the elongated tubular component; a switch operable to power on the vacuum in response to activation of the proximity sensor; a switch box defining a hollow interior recess housing a coiled power cable; a mounting plate comprising a planar base plate defining a bore dimensioned in congruency with a dimension of an outer surface of the sidewall, the mounting plate further comprising an elongated protuberance jutting from a surface of the base plate; a vacuum having a reservoir for storing debris sucked into the vacuum; and a flexible arm interconnecting the elongated tubular component and the vacuum.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It is an object of the present invention to provide a live rodent trap which may suck rodents from interior wall cavities without harm to the rodents.

Figure 1:
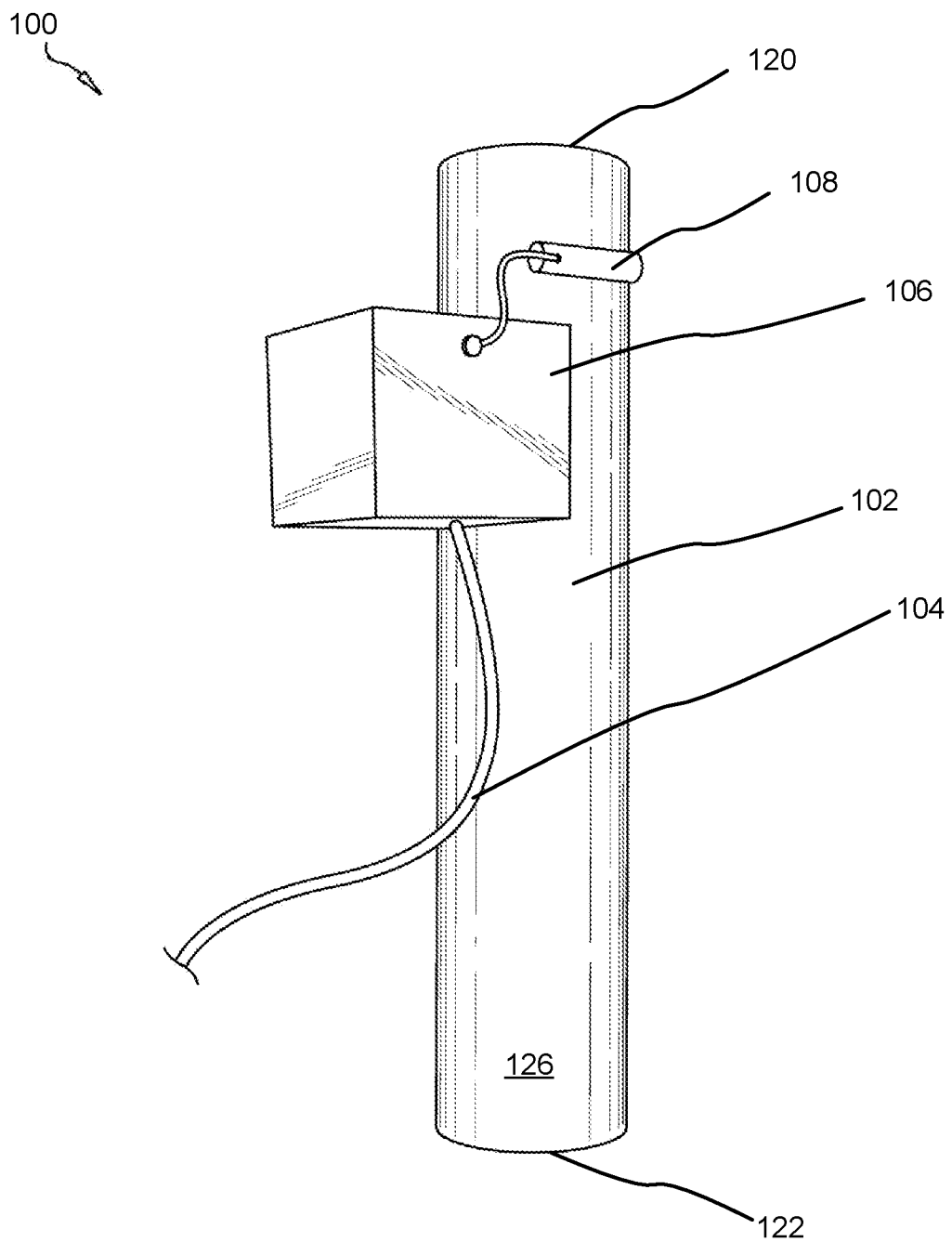
FIG. 1 is a side perspective view illustrating one embodiment of a live rodent trap with vacuum function in accordance with the present invention.

FIG. 1 is a side perspective view illustrating one embodiment of a live rodent trap with vacuum function 100 in accordance with the present invention.

The trap 100 comprises an elongated tubular member 102 of sufficient diameter to allow ingress of a mouse, rat, or other rodent. In various embodiments, the tubular component 102 is between 1-6 inches in diameter. In the shown embodiment, the tubular component 102 is 3 inches in diameter.

The tubular component 102 comprises an open distal end 120 and an open proximal end 122. The tubular component 102 defines a hollow interior cavity through which the rodent 206 traverses. A sidewall 126 of the tubular component 102 is affixed to switch box 106.

The switch box 106 encloses, in various embodiments, a switch, powered by a power cable 104. The switch box 106 may comprise a cubic housing affixed using means known to those of skill in the art to the sidewall 126, including screws, friction fits, adhesive and the like. In various embodiments, the sidewall 126 and switch box 106 are formed as a single integrated piece.

The switch box 106 may include dataprocessing devices (DPDs), such as wireless adapters, cameras, microphones or transceivers, for putting the switch box 106 into logical communication with a separate DPD such as a server, desktop, tablet computer, or other DPD having software, firmware, or computer-program products configured to monitor a status of trap 100. In various embodiments, these internal DPDs within the switch box 106 are operable to send a notice to an external DPD over a LAN (local area network) that the trap 100 has been activated.

The switch box 106 includes a sensor 108, which may be internal to the switch box 106. The sensor 108 may comprise a proximity sensor. In various other embodiments, the sensor 108 may comprise a light-sensor for detecting changes in light within the tubular component 102. The sensor 108 may be operable to switch on a digital camera for recording functionality and transmit an image or video stream to the external DPD. The light sensor may comprise any sensor of light or electromagnetic energy known to those of skill in the art, including a photoemission sensor, a photoelectric sensor, a photovoltaic sensor, a thermal sensor, a polarization sensor, a photochemical sensor and the like, or any combination of the above.

In various embodiments, the sensor 108 penetrates the sidewall 126 such that a rodent 206 moving through the tubular component 102 may activate the sensor 108. In other embodiments, however, the sensor 108 does not penetrate the side 126 and the sensor 108 comprises a motion-activated sensor operable to switch on the vacuum 202 in response to vibrations of the tubular component 202.

In some embodiments of the present invention, the switch box 106 is omitted, the trap 100 comprising only the sensor 108 having an internal switch.

Figure 2:
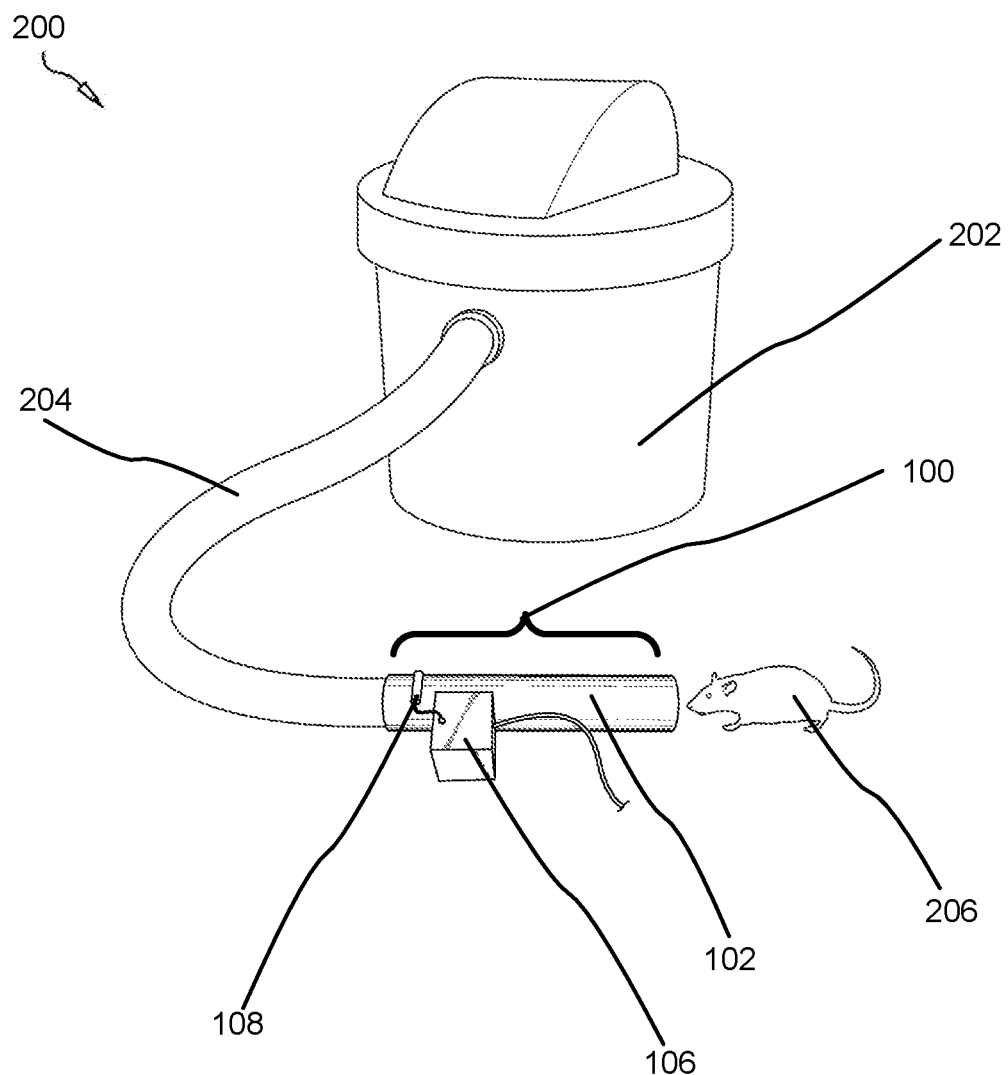
FIG. 2 is a side perspective view illustrating one embodiment of a live rodent trap with vacuum function in accordance with the present invention.

FIG. 2 is a side perspective view illustrating one embodiment of a live rodent trap with vacuum function 200 in accordance with the present invention.

In various embodiments, the trap 200 comprises a shop vac or other vacuum having internal storage capacity, as well as a flexible arm 204, and adapted to suck items into the vacuum 202 through the arm 204. The flexible arm 204 interconnects the tubular component 102 and the vacuum 202. The flexible arm 204 affixes to the proximal end 122 of the tubular component 102 and may be connected therewith using couplers, adapters, threading, or other means known to those of skill in the art.

Activation of the sensor 108 switches on the vacuum 202.

The rodent 206 is attracted to the open distal end 120 by bait placed within the hollow interior recess, cavity, or channel of the tubular component 102. The bait may include baits known to be used in rodent traps by those of skill in the art, including cheese, chocolate, and perishable foods. The bait and/or sensor 108 may be positioned between 1-24 inches interiorly to the tubular component 102 from the open distal end 120 such that there is not sufficient space behind an entering rodent 206 for the rodent to escape the suction when it begins.

When the rodent 206 enters the tubular component 102, the rodent 206 activates the sensor 108 and the vacuum 202 in response, which vacuum 202 sucks the rodent 206 into a reservoir or holding tank within the vacuum.

Figure 3:
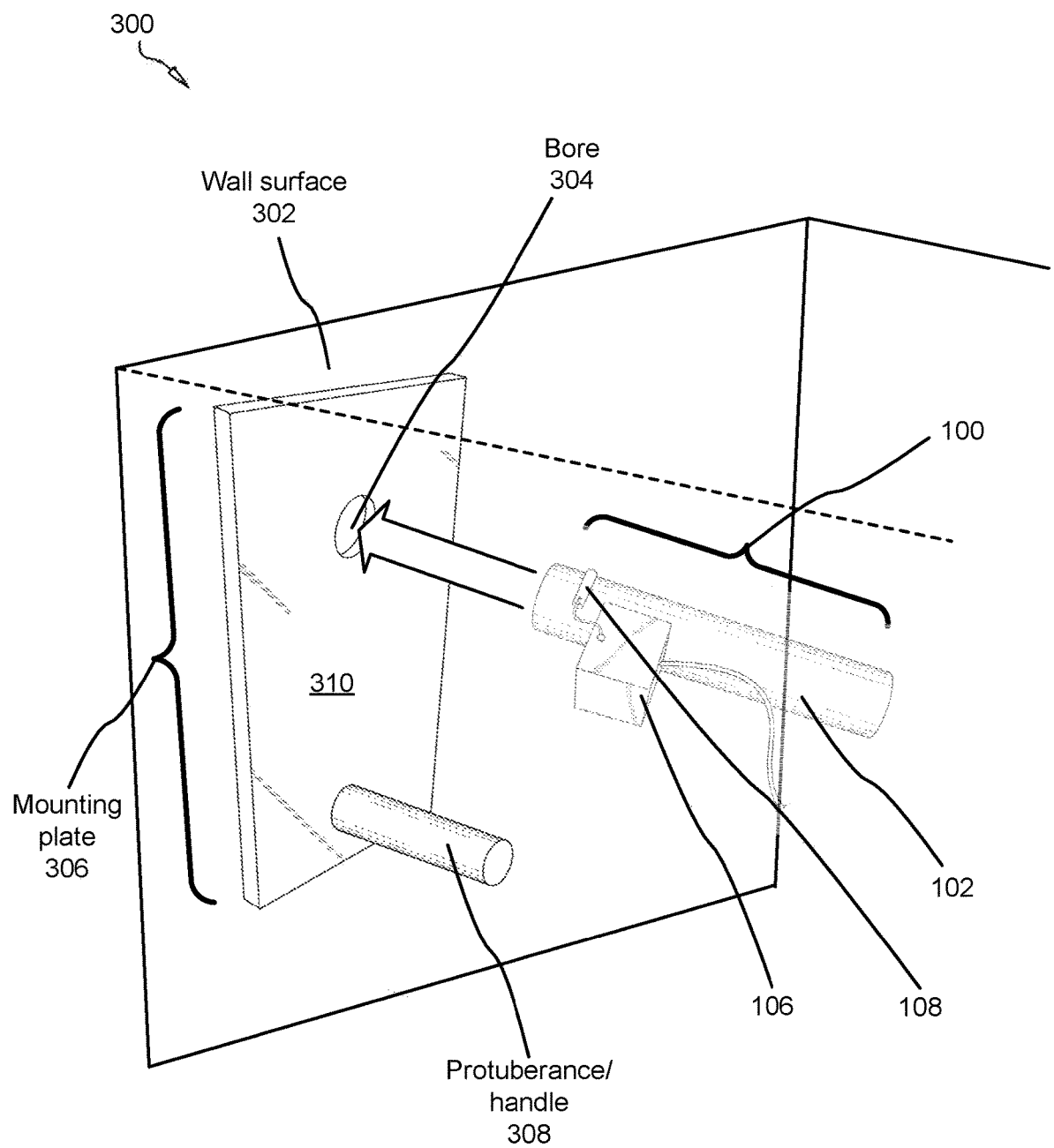
FIG. 3 is an environmental, side perspective view illustrating one embodiment of a live rodent trap assembly with vacuum function in accordance with the present invention.

FIG. 3 is an environmental, side perspective view illustrating one embodiment of a live rodent trap assembly with vacuum function 300 in accordance with the present invention.

For maximum effectiveness, the tubular component 102 must be inserted into one or more inaccessible, or less accessible, spaces within a building, such as cavities of interior walls 202 or ceilings. In furtherance of this objective, a mounting plate 306 is provided which forms part of the assembly 300.

The mounting plate 306 may comprise a base plate 310 which may be rectangular, square, ovoid or otherwise shaped. In some embodiments, a protuberance 308, or handle, affixes to a surface of the base plate 310. The base plate 310 defines a bore 304, or aperture, which traverses the base plate 310. The bore 304 is dimensioned to receive the distal end 120 of the tubular component 120.

In various embodiments, the mounting plate 306 is detachably affixed to a wall surface 302, a ceiling, a column, or another interior or exterior surface of a building. The bore 304 disposes over a corresponding bore drilled into the surface upon which the mounting plate 306 is positioned. The open distal end 120 is inserted through the mounting plate 306 and the bore drilled into a surface of the building. The assembly 300 is left in place until activated by a rodent 206.

Figure 4:
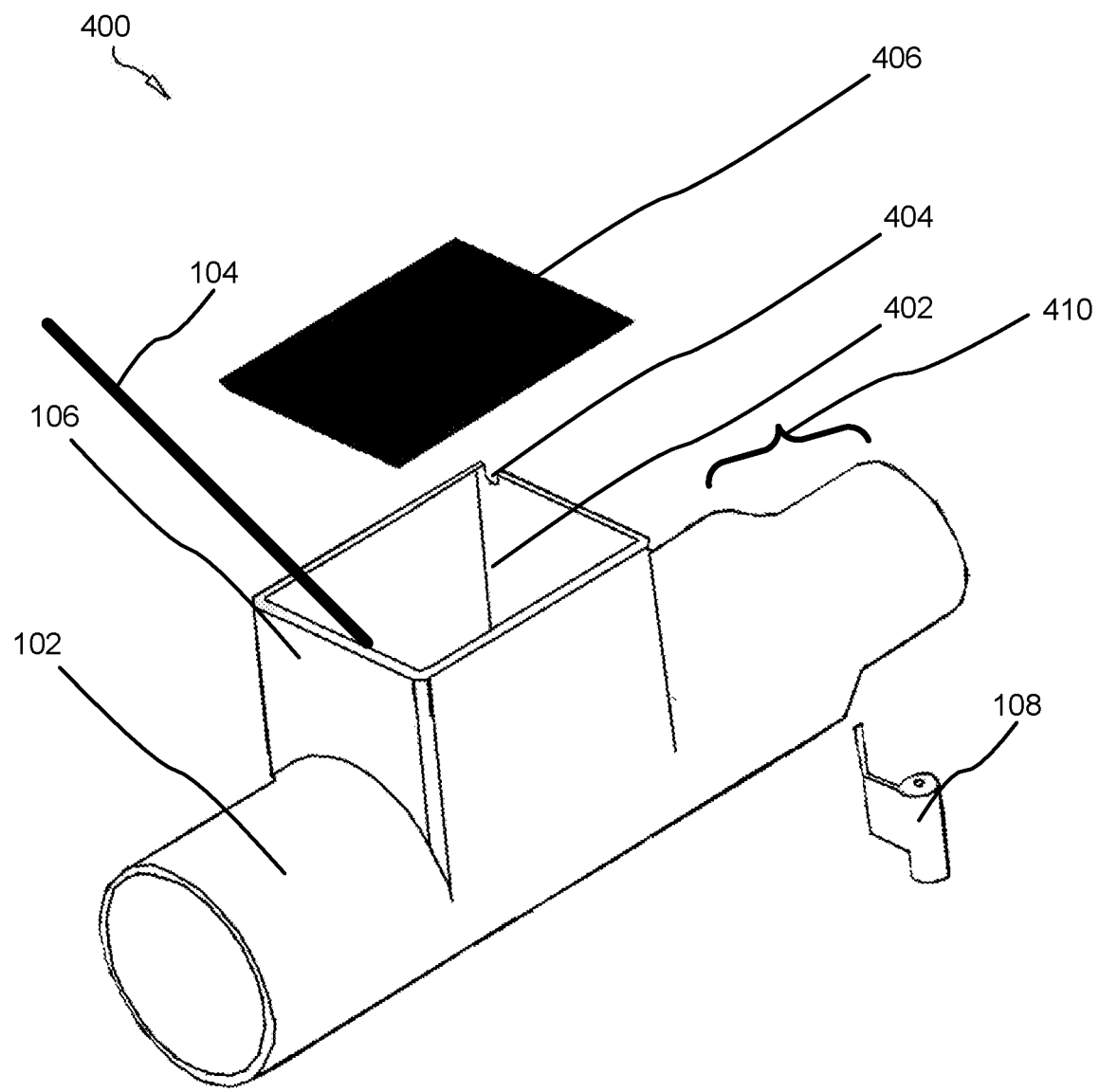
FIG. 4 is a side perspective view illustrating one embodiment of a live rodent trap assembly with vacuum function in accordance with the present invention.

FIG. 4 is a side perspective view illustrating one embodiment of a live rodent trap assembly with vacuum function 400 in accordance with the present invention.

In various embodiments, the switch box 106 may comprise a hollow interior recess 402 which may house the power cable 104 in a coiled configuration. A lid 406 may snap down over an open top end of the switch box 106 or otherwise affix to an open top end of the switch box 106. The lid may be square rectangular irregularly shaped. A battery may dispose within the hollow interior recess 402. A notch 404, or slot 404, may form along on a top edge of the switch box 106. The power cable 104 may protrude from the switch box 106 through the notch 404.

In various embodiments, one end of the tubular component 102 may be tapered 410 as shown to facilitate coupling with a vacuum attachment.

Figure 5:
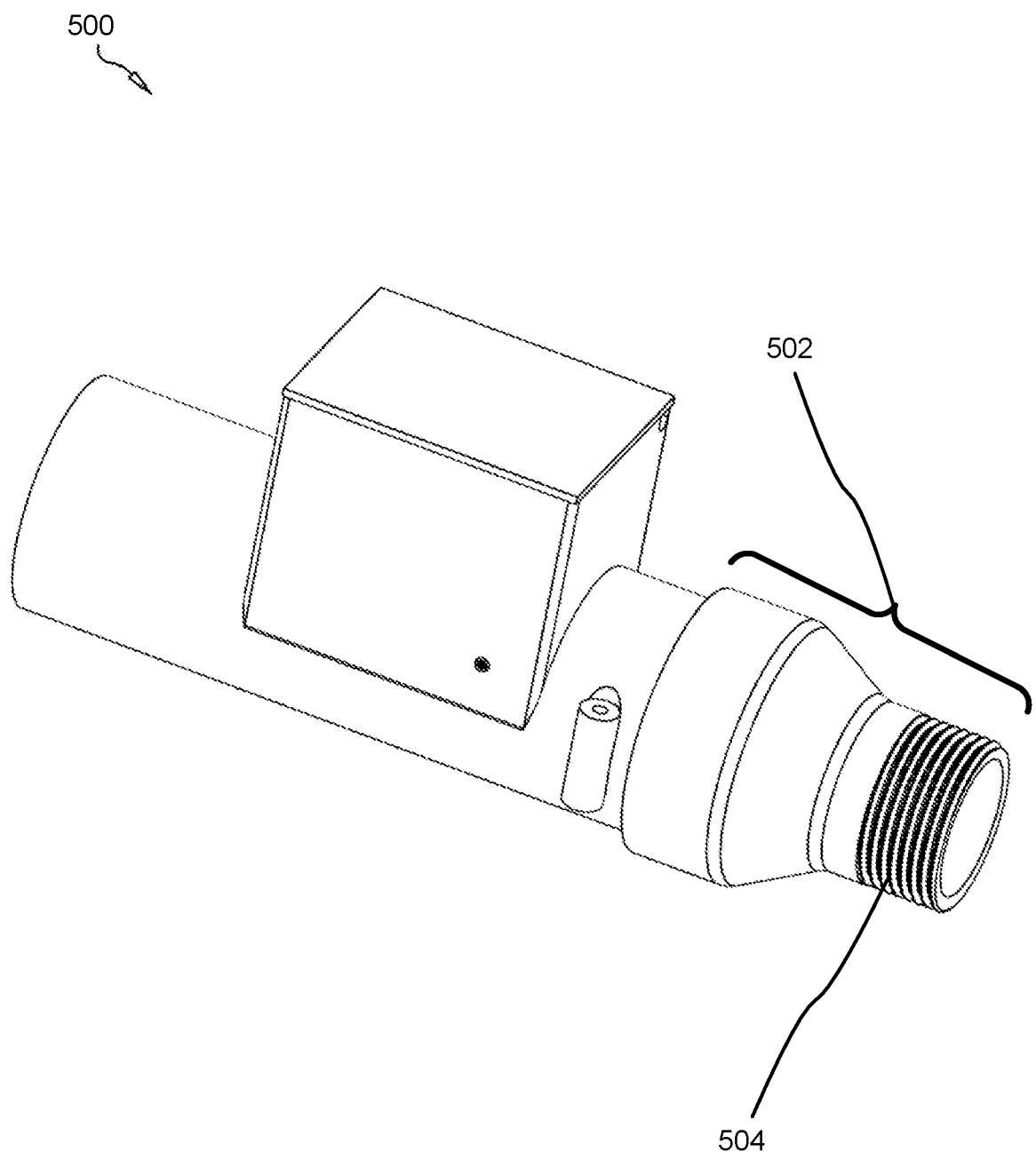
FIG. 5 is a side perspective view illustrating one embodiment of a live rodent trap assembly with vacuum function in accordance with the present invention.

FIG. 5 is a side perspective view illustrating one embodiment of a live rodent trap assembly with vacuum function 500 in accordance with the present invention.

In various embodiments, the apparatus 500 comprises a coupler 502 adapted to couple to either the distal or proximal end of the tubular component 102. The coupler 502 may taper as shown and/or may be frustoconical in shape. The tip 504 of the coupler 502 may be threaded as shown. The coupler may insert over the tubular component 102 as shown, or interiorly thereto.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A live rodent trap with vacuum function adapted to trap a live rodent, the rodent trap comprising:
    an elongated tubular component comprising a sidewall having an open proximal end and an open distal end, the tubular component defining a hollow interior recess of between 1-6 inches wide within the sidewall;
    a proximity sensor affixed to the tubular component between 1 and 24 inches from the open distal end, the proximity sensor penetrating a sidewall of the elongated tubular component;
    a vacuum having a reservoir for storing debris sucked into the vacuum;
    a switch operable to power on the vacuum in response to activation of the proximity sensor;
    a mounting plate comprising a planar base plate defining a bore dimensioned in congruency with a dimension of an outer surface of the sidewall;
    and
    a flexible arm interconnecting the elongated tubular component and the vacuum.

2. The rodent trap of claim 1, wherein the mounting plate further comprises an elongated protuberance jutting from a surface of the base plate.

3. The rodent trap of claim 1, wherein the mounting plate is mounted on one of a wall and ceiling.

4. The rodent trap of claim 1, further comprising a switch box and power cable affixed to the sidewall.

5. The rodent trap of claim 4, wherein the switch box further comprises one or more of a wireless transceiver, a camera, a microphone, and motion detector.

6. The rodent trap of claim 4, wherein the switch box defines a notch through which a portion of the power cable protrudes.

7. The rodent trap of claim 1, further comprising a perishable food mounted within the hollow interior recess adapted to serve as bait for a rodent.

* * * * *